US008255801B2

(12) United States Patent  
Ahmad et al.

(10) Patent No.: US 8,255,801 B2
(45) Date of Patent: Aug. 28, 2012

(54) WEB BASED VIDEO ENHANCEMENT APPARATUS, METHOD, AND ARTICLE OF MANUFACTURE

(75) Inventors: Subutai Ahmad, Palo Alto, CA (US); Jonathan Cohen, San Francisco, CA (US)

(73) Assignee: Elet Systems, L.L.C., Wilmington, DE (US)

( * ) Notice: Subject to any disclaimer, the term of this patent is extended or adjusted under 35 U.S.C. 154(b) by 118 days.

(21) Appl. No.: 12/426,755

(22) Filed: Apr. 20, 2009

(65) Prior Publication Data

US 2009/0288102 A1 Nov. 19, 2009

Related U.S. Application Data

(63) Continuation of application No. 10/871,604, filed on Jun. 17, 2004, now Pat. No. 7,523,464, which is a continuation of application No. 09/364,754, filed on Jul. 30, 1999, now Pat. No. 6,775,835.

(51) Int. Cl.
*G06F 3/048* (2006.01)

(52) U.S. Cl. ......... 715/706; 715/700; 345/418; 345/619

(58) Field of Classification Search ............... 345/418, 345/619; 715/700, 706
See application file for complete search history.

(56) References Cited

U.S. PATENT DOCUMENTS

| | | | |
|---|---|---|---|
| 4,843,568 A | 6/1989 | Krueger | |
| 5,148,477 A | 9/1992 | Neely | |
| 5,454,043 A | 9/1995 | Freeman | |
| 5,534,917 A | 7/1996 | MacDougall | |
| 5,548,659 A | 8/1996 | Okamoto | |
| 5,570,113 A | 10/1996 | Zetts | |
| 5,581,276 A | 12/1996 | Cipolla | |
| 5,623,587 A | 4/1997 | Bulman | |
| 5,631,697 A | 5/1997 | Nishimura | |
| 5,745,761 A | 4/1998 | Celi, Jr. | |
| 5,767,867 A | 6/1998 | Hu | |
| 5,781,198 A | 7/1998 | Korn | |
| 5,790,124 A | 8/1998 | Fischer | |
| 5,905,492 A | 5/1999 | Straub | |
| 5,991,878 A | 11/1999 | McDonough | |
| 6,043,828 A | 3/2000 | Ort | |
| 6,091,410 A * | 7/2000 | Lection et al. | 715/706 |
| 6,314,565 B1 | 11/2001 | Kenner | |
| 6,320,600 B1 | 11/2001 | Smith | |
| 6,380,978 B1 | 4/2002 | Adams | |
| 6,683,625 B2 | 1/2004 | Muthusamy | |
| 6,738,066 B1 | 5/2004 | Nguyen | |
| 6,842,175 B1 | 1/2005 | Schmalstieg | |
| 6,928,396 B2 | 8/2005 | Thackston | |
| 6,995,759 B1 | 2/2006 | Gallery | |
| 7,493,558 B2 * | 2/2009 | Leahy et al. | 715/704 |

OTHER PUBLICATIONS

Aggarwal, J. K., and Q. Cai, "Human Motion Analysis: a Review," Proceedings of the IEEE Workshop on Nonrigid and Articulated Motion, San Juan, Puerto Rico, Jun. 16, 1997, pp. 90-102.

(Continued)

*Primary Examiner* — Andy Ho

(57) ABSTRACT

Controlling an event in a virtual environment is disclosed. A video image from one or more video cameras is received. A video enhanced script is executed to display the virtual environment in a video display within a web browser. An event in the virtual environment is controlled based on the video image. The video enhanced script is configured to communicate with a web browser extension module.

18 Claims, 7 Drawing Sheets

OTHER PUBLICATIONS

Barbie Photo Designer w/Digital Camera (Box), Mattel Interactive, Release date Sep. 30, 1998, [retrieved Apr. 8, 2009].

Brennan, R., "Review: Game Boy Camera," Jul. 15, 1998, [retrieved Oct. 26, 1999].

Crow, F.C., "Summed-Area Tables for Texture Mapping," Computer Graphics 18(3):207-212, Jul. 1984.

Huang, C.-L., and M.-S. Wu, "A Model-Based Complex Background Gesture Recognition System," Proceedings of the IEEE International Conference on Systems, Man, and Cybernetics, vol. 1, Beijing, Oct. 14-17, 1996, pp. 93-98.

Pentland, A.P., "Smart Rooms," Scientific American, Apr. 1996, pp. 68-76.

"3DK: The Virtual Studio," Blending Real and Virtual Spaces, Research Area: Intelligent Multimedia Systems, GMD, Nov. 24, 1994.

* cited by examiner

WEB BASED VIDEO ENHANCEMENT APPARATUS, METHOD, AND ARTICLE OF MANUFACTURE

CROSS-REFERENCES TO RELATED APPLICATIONS

This application is a continuation of U.S. patent application Ser. No. 10/871,604, filed Jun. 17, 2004, now U.S. Pat. No. 7,523,464, which is a continuation of U.S. patent application Ser. No. 09/364,754, filed Jul. 30, 1999, now U.S. Pat. No. 6,775,835, the entire disclosures of which are hereby incorporated by reference. This application is also related to U.S. Pat. No. 6,738,066, filed Jul. 30, 1999, and U.S. Pat. No. 6,545,706, filed Jul. 30, 1999, each of which were filed concurrently with the parent application and are incorporated by reference herein.

BACKGROUND

The Related Art

Video teleconferencing is typically implemented by sending video transmissions over standard telephone connections. In the typical video teleconferencing set-up each user has a video camera that transmits an image over standard telephone lines to a monitor at the site of the other user. Video teleconferencing over telephone lines, however, tends to limit users to configurations involving only two sites.

The rise of the Internet and inexpensive video cameras presently allows digitized video images to be transmitted across the Internet or any other wide area network (WAN). Video conferencing over a WAN involves sending a digitized video signal from a video camera to an Internet Service Provider (ISP) connected to the Internet or, more generally, to a server connected to a WAN. The digitized video signal is sent across the WAN to one or more computers that may each display the video signal on a monitor. Information such as digitized video may be transmitted across a WAN by packet switching between servers according to the TCP/IP protocol. This arrangement allows multiple computers to simultaneously share video with one another. Therefore, video conferencing over a WAN has advantages over video teleconferencing in that more sites than just two can be conveniently and inexpensively connected. Video conferencing over a WAN, however, is still limited to sharing real-time images and does not take advantage of image enhancement possibilities.

Other applications for digital video over the Internet and WANs have led to increased sharing of video files and the rise of "webcams." Video files, pre-recorded video ranging from several seconds to many minutes in length, may be transmitted from a sender to one or more receivers simultaneously across the Internet. A receiver may store the video file and view it repeatedly, provided that the receiver has the necessary software to play the video file. A video file may also be made available, for instance, on a webpage or a FTP site located on a remote server so that multiple users may choose to download it at their convenience.

A webcam is a digital video camera set up to provide live video to the Internet or a WAN such that any user connected to the network may choose to view what the camera is imaging. Webcams are increasingly used to make available, for example, live images of traffic conditions, weather, public meetings, and fish bowls, to users anywhere in the world with Internet access. To simplify the viewing process, some web browsers include a module designed to display live video, so that the user need not run a separate software program. It should be noted that as browsers become increasingly more powerful they become increasingly similar to operating systems. For the purposes of this application, a browser could be an operating system so long as the operating system includes the capabilities typically attributable to browsers such as the ability to connect to remote sites across a WAN and accept software extension modules.

Software extension modules, commonly known as a plug-ins, provide additional functionalities to other software programs. A plug-in, once installed, becomes a seamless part of the software within which it is installed. Plug-in programs may themselves accept additional plug-ins to expand their own capabilities. For example, ShockWave produced by Macromedia, a popular multimedia player plug-in for web browsers, has discrete modules for specific purposes, for example one module for playing sounds and another module for playing animations. ShockWave may be extended with additional plug-ins that act as further modules for other media applications such as live video.

Like text files, sound files, video files, and live video, anything in a digitized format may be sent across a WAN. Consequently, plug-ins are frequently made available over the Internet for downloading from a remote server. Other programs may also be obtained via the Internet. One such program designed to perform a specific operation is called a script. An example of a script is an Applet, a program written in the Java programming language, which can be distributed over a WAN and executed by a Java-enabled web browser. Scripts written in other programming languages may also be distributed over a WAN.

A script may require certain plug-ins to be available in order to perform its function properly. For example, one might design a script to guide a user to select an appropriate automobile for their needs by prompting the user to answer specific questions. As part of the selection process the script might display images of vehicles the user has to choose from. In order to display those images, the script would access the plug-in that enables image viewing and supply that plug-in with file names and locations of the images to be displayed. Those addresses may be on the same computer as the browser, or on a network server that the computer is attached to, or on a remote server accessible over a WAN.

The Internet has also expanded a user's options for communicating with others, in addition to providing a means for accessing programs and data from remote sites. Accordingly, a person can send and receive electronic messages ("e-mail") over a WAN with typically only a brief time delay. Electronic messages may also be shared in real-time between individuals connected to the Internet; this process has come to be referred to as "chat" and is frequently conducted in "chatrooms," that are dedicated websites where multiple individuals can converse simultaneously. A chatroom is the functional equivalent of the telephone party-line, except that the conversation is carried out with text rather than with voice.

As communications technologies have been developed for the Internet those technologies have been applied to gaming. It is now possible to download gaming software from a website and play it on a host computer. It is also possible to play a game over the Internet where the gaming software is located on a remote server rather than on the user's computer. Further, multiple players in multiple locations may take part in the same game over the Internet.

In addition to developments concerning the Internet, the recent development of low-cost image sensors used in cameras has led companies to develop more products that include imaging. For instance, Nintendo offers a black and white camera that attaches to a Game Boy personal video game system and a paint program that allows a user to manipulate and alter the images. The Game Boy camera has a lens that rotates so the user can obtain self-portraits. Mattel Media, too, offers a Barbie Digital Camera that takes color images and comes with software that lets children edit their images into Barbie scenes and to further print them on cards and stickers. Further advancements have also been made in image analysis and recognition. For example, Scientific American reported on the development of a system called Person Finder that can track one person as he or she moves around in a room ("Smart Rooms," Scientific American, April 1996). The system records the image of the person and the room, determines where the person is, creates a virtual model of the person, and projects the model into a virtual world so that, for instance, imaginary characters can interact with the smart-room user.

Absent from this mix of digital technologies is software that will allow one or more live video images from one or more personal digital video cameras to be incorporated into a virtual environment displayed within one or more browsers so that the person or people can use their image or images to control events within the virtual environment.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention describes a video enhancer for a web browser. The video enhancer consists of a library of video enhancement routines, a browser extension module coupling the library of routines to the web browser, and a video enhanced script coupled to the browser extension so that it may utilize at least one of the enhancement routines within the library to provide an enhanced video display within the web browser. In some embodiments of the present invention the library of routines are provided as dynamically linked libraries (DLLs) such as C++ DLLs. In some embodiments the browser extension module includes a translator and a multimedia extension module, such as the ShockWave plug-in produced by Macromedia. Other embodiments may be fully integrated to be able to interface directly with a web browser and not need the multimedia extension module.

The video enhancer of the present invention includes a video enhanced script that may be an Applet running in conjunction with the operating web browser or running independently. The video enhanced script calls upon enhanced video routines. Some routines, for instance, provide the ability to identify and track the head of a person in front of a video camera, while other routines may provide the ability to determine when at least two tracked features collide.

Another embodiment of the present invention is a computer-implemented system for playing a game. This computer-implemented system includes a first computer, a first video camera coupled to the first computer, a web browser operating on the first computer, and a video enhancer for the web browser. The video enhancer further includes a library of video enhancement routines that may be in communication with the first video camera, a browser extension module coupling the library to the web browser, and a video enhanced script. The video enhanced script is itself coupled to the web browser and may use at least one enhancement routine of the plurality of routines in the library to provide enhanced video displays within the web browser. Additional embodiments of the computer-implemented system also include a wide area network (WAN) and a server connected to the WAN, with the first computer being connected to the WAN.

In some embodiments of the computer-implemented system the video enhanced script allows the game to be played while the video enhanced script is being downloaded to the first computer from the server via the WAN. In other embodiments the video enhanced script allows a player to send information, such as a cookie, to a server to be retained for future reference after a game is over. In further embodiments the video enhanced script maintains communication with a remote server through the operating web browser. Yet other embodiments of the computer-implemented system further include a second computer that may include a video camera, and is configured like the first computer, though it need not include the video enhancer if the first computer is so equipped.

Another embodiment of the present invention is a method for video enhancement over a wide area network. The method includes providing a web browser, providing a video enhancer for the web browser, opening the web browser, and executing a selected video enhanced script. In some embodiments the method for video enhancement also includes, before executing the script, determining whether a more current version of the video enhancer is available. If an update is available the user is queried whether the more current version should be obtained, and if the user requests the update it is obtained. In some embodiments obtaining the video enhancer update includes downloading the update from a server connected to a WAN and installing the update within the web browser.

In some embodiments of the method for video enhancement the process of executing the selected script further includes passing a command from the selected script to the browser extension to be executed, where the command specifies at least one video enhancement routine and includes parameters required by those routines. In other embodiments executing the selected script instead involves passing a command from the selected script to a multimedia extension module, passing the command from the multimedia extension module to a translator, and executing at least one video enhancement routine.

A further embodiment of the present invention is an article of manufacture comprising a computer readable medium containing code segments for providing a video enhancer for a web browser. The video enhancer includes a library of at least one video enhancement routine and a browser extension module operative to couple the library to the web browser. In some embodiments the video enhancer further includes at least one video enhanced script that may be coupled to the web browser to utilize at least one video enhancement routine.

These and other aspects and advantages of the present invention will become more apparent when the Description below is read in conjunction with the accompanying drawings.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
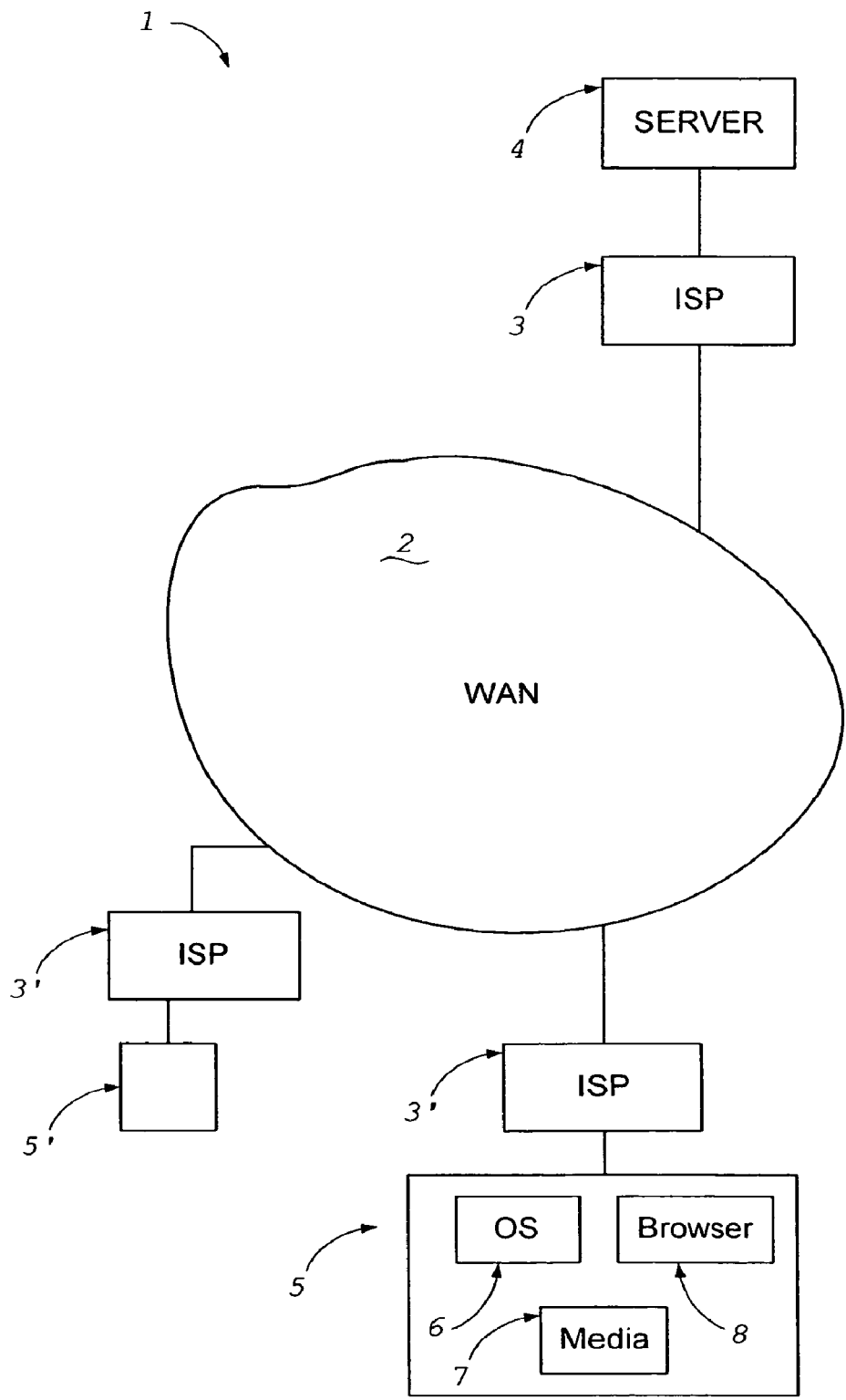
FIG. 1 is an overview of the basic elements of a system of computers joined across a wide area network.

FIG. 1 illustrates an overview of the basic elements of a system of computers joined across a wide area network. The entire system 1 consists of a wide area network (WAN) 2, such as the Internet, connecting service providers 3 and allowing the sharing of data packets according to the TCP/IP protocol. Connected to WAN 2 is a service provider 3 that is further connected to a server 4 that is configured to both distribute and receive files, data, and programs across the WAN 2. A computer system 5 of a user is connected through a service provider 3' to the WAN 2 in order to share files, data, and programs with server 4. Additional computer systems 5' may similarly be connected to the WAN 2. Each computer system 5 comprises at least an operating system 6, storage media 7 for saving data, files, and programs, and a web browser 8 to facilitate communication between the computer system 5 and the service provider 3'.

Figure 2:
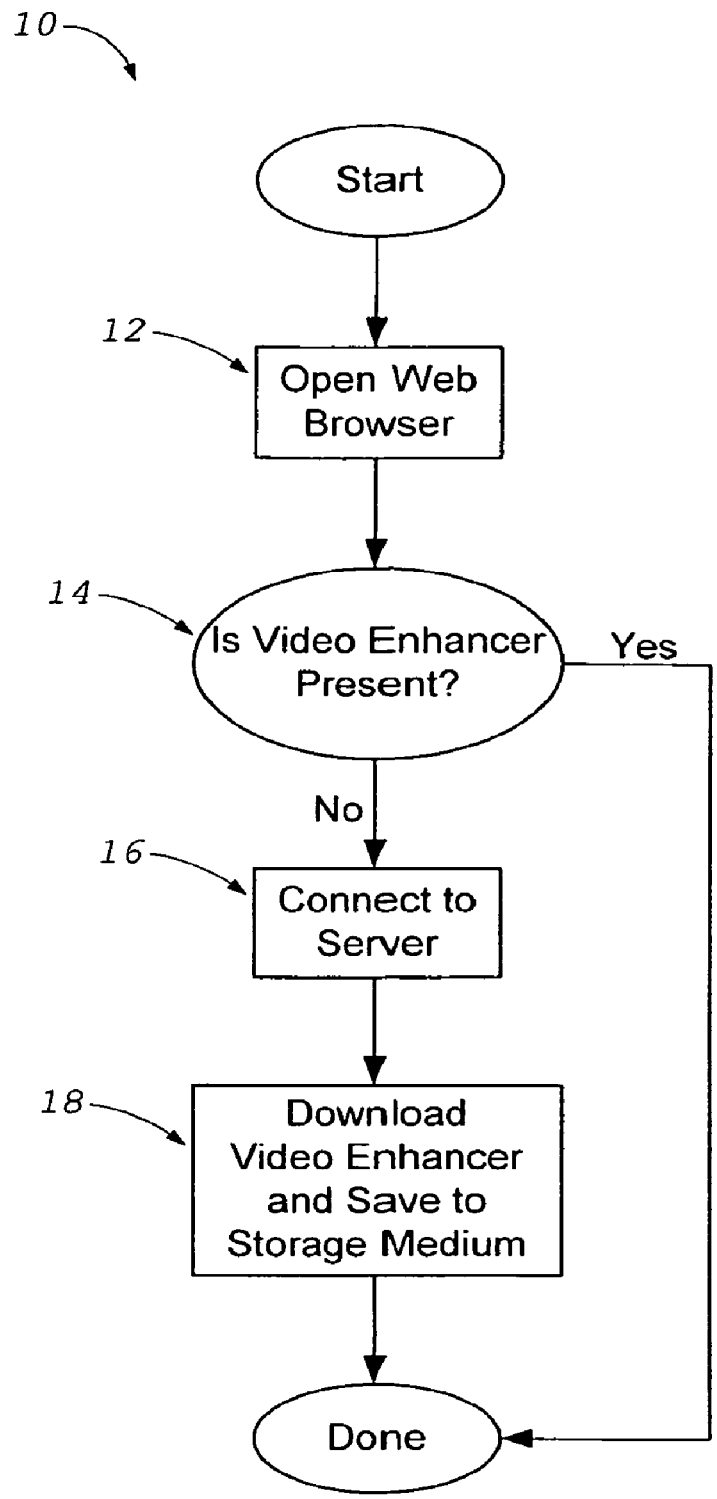
FIG. 2 is a flow chart for the process of obtaining a video enhancer of the present invention from a server.

FIG. 2 shows a flow chart for the process 10 of obtaining a video enhancer of the present invention from a server 4. In other embodiments, described below, the video enhancer of the present invention may be obtained on a CD-rom, magnetic storage disk, it may be provided as part of a package of other software. In the first act or operation 12 a web browser 8 is opened. In the next act or operation 14 the user determines whether the video enhancer is already present within the web browser 8. Act or operation 14 may be prompted by the user's desire to obtain the video enhancer because of a pre-existing awareness of its desirability. Alternately, the user may attempt to run an application within the web browser 8 environment that requires the video enhancer, however that video enhancer is missing and the user is therefore prompted to obtain the video enhancer. If the video enhancer is present within the web browser 8, then the process 10 is finished. Otherwise, the user progresses to act or operation 16.

In act or operation 26 the web browser 8 is connected to a server 4. Connection to the server 4 is made by creating a connection to a WAN 2 such as the Internet and by providing the web browser 8 with the IP address of the server 4. The IP address of the server 4 may be obtained in many ways. For example, the IP address may be specified by an existing application that will not run without the required video enhancer, it may be obtained by performing a search of the World Wide Web using a search engine, it may be obtained from promotional materials, or it may be obtained from other users. Once the web browser 8 has connected to the server 4, in act or operation 18 the desired video enhancer is downloaded to the user's computer system 5 to be stored on a user specified storage medium 7. That medium 7 may be the working memory of the user's computer 5, a storage device connected to the computer 5 such as a magnetic disk drive, or a storage device connected to a network of which the user's computer 5 is a part. Once the video enhancer is saved to a storage medium 7 the process 10 is complete.

Figure 3:
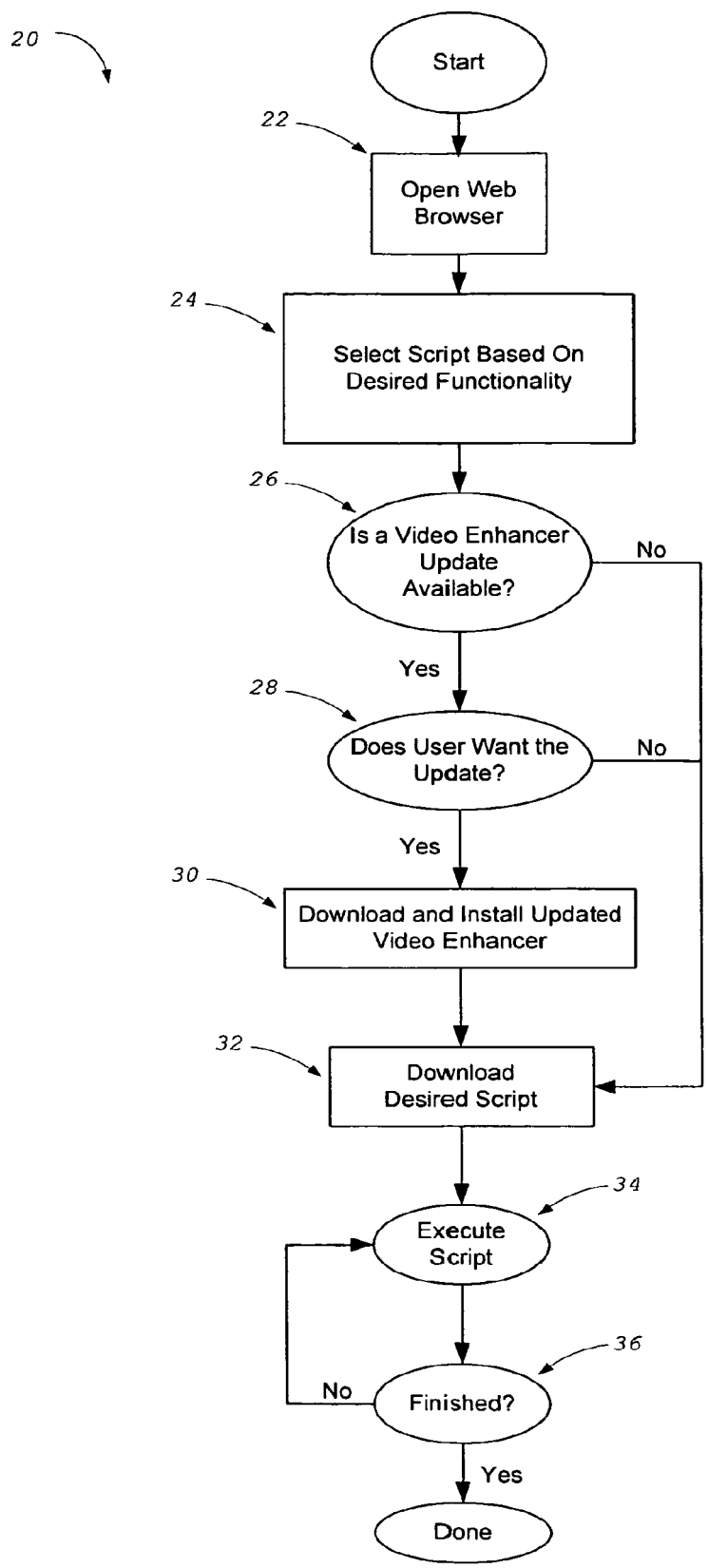
FIG. 3 is a flow chart for the process of selecting and executing a script.

FIG. 3 shows a flow chart for the process 20 of selecting and executing a script. In the first act or operation 22 the user opens a web browser 8. In the next act or operation 24 the user accesses a server 4 configured to store one or more scripts and selects a script for one or more desirable functionalities. For example, a script may have the functionality of performing a game.

In act or operation 26 the selected script looks to the user's web browser 8 and to the server 4 to determine if the server 4 has a more current (updated) video enhancer than is present within the user's web browser 8. If the video enhancer in the user's web browser 8 is current, then the script is downloaded in act or operation 32. If an updated video enhancer is available on the server 4, the user is asked in act or operation 28 whether she would like the updated video enhancer. If the user requests the updated video enhancer, then it is downloaded from the server 4 to the user's web browser 8 and installed therein in act or operation 30, prior to downloading the selected script in act or operation 32. Alternately, if the user does not want the updated video enhancer at act or operation 28 then the selected script is downloaded in act or operation 32.

In act or operation 34 the selected script is executed, as will be described in greater detail below with reference to FIG. 3. Once the selected script has been executed, the user has the option in act or operation 36 to execute the script again. If the user so chooses, act or operation 34 is repeated, otherwise the process 20 is complete.

Figure 4:
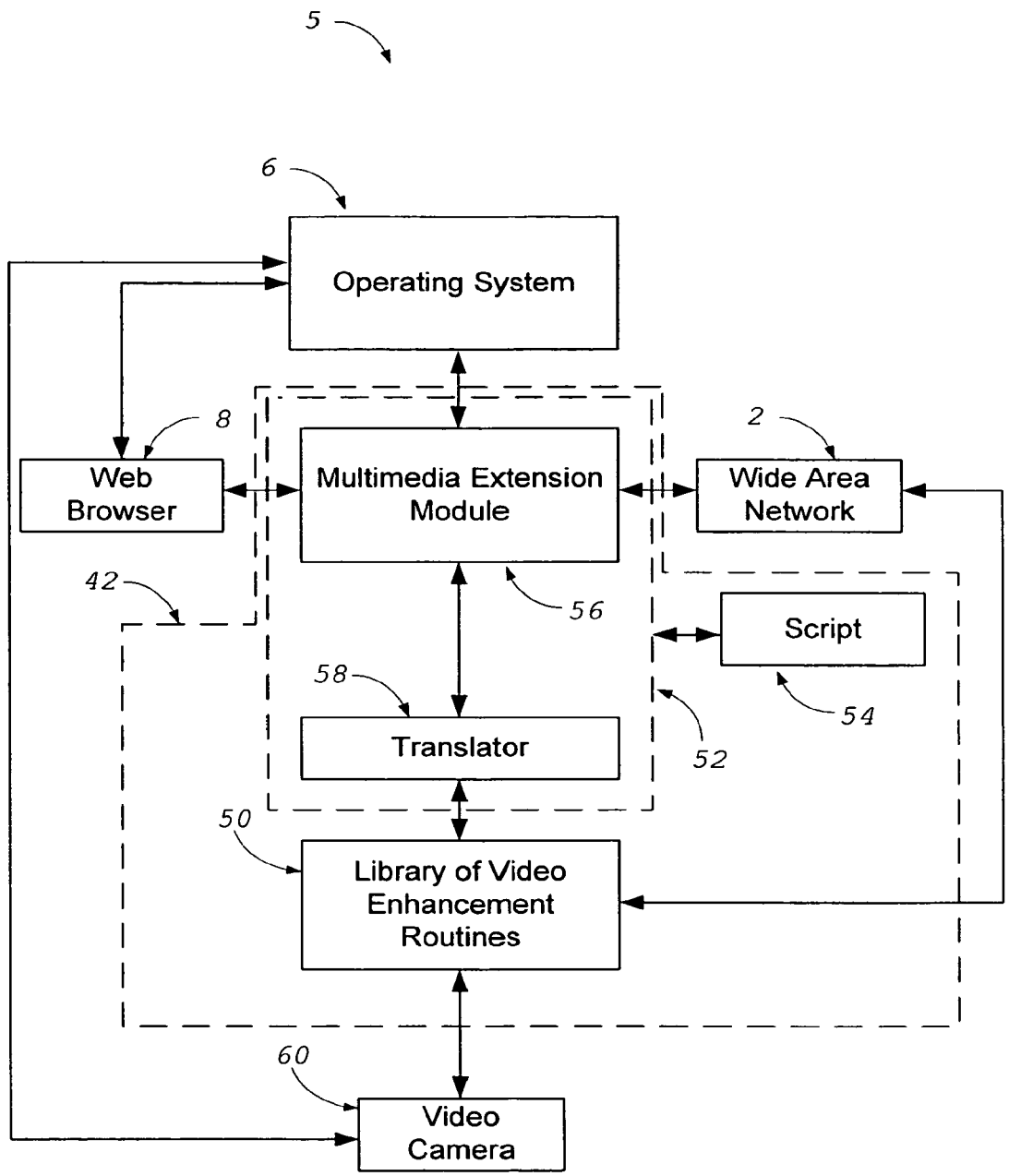
FIG. 4 is a schematic diagram of a computer system including a video enhancer of the present invention.

FIG. 4 is a schematic diagram of a computer system 5 including a video enhancer 42 for a web browser 8, an operating system 6, and a wide area network (WAN) 2. The video enhancer 42 further includes a library of video enhancement routines 50, a browser extension module 52, and a video enhanced script 54. Both the browser extension module 52 and the library of video enhancement routines 50 may be obtained by downloading them from a remote server 4 over the WAN 2 to the user's computer system 5. Alternately, both the browser extension module 52 and the library of video enhancement routines 50 may be downloaded to a local server 4 to which the user's computer system 5 is connected. In another embodiment either or both of the browser extension module 52 and the library of video enhancement routines 50 may be maintained on a remote server 4 and accessed over the WAN 2.

The operating system 6 provides a basic framework within which all of the accessories on the user's computer 5 may operate, including the web browser 8 and a video camera 60. Examples of operating systems 6 include Apple's operating system for the Macintosh line of computers, Microsoft's Windows 98, and Linux. The web browser 8, when coupled with the browser extension module 52, becomes a program capable of executing a video enhanced script 54. Examples of web browsers 44 include Microsoft's Internet Explorer and Netscape's Navigator. In order to execute a video enhanced script 54, the browser extension module 52 may run one or more video enhancement routines from the library 50, which may, in turn, require the video output from the video camera 60. It should also be noted that although the output from a video camera 60 may at times be preferable, any digitized video image can be used. For example, AVI and MPG files, representing two different formats for digitized video files, streaming video received across a WAN 2 may be substituted for the output from a video camera 60. It is likewise unimportant where the video image comes from, so the video camera 60 supplying the image may be linked to computer system 5 by WAN 2, or it may come from a stored video file on a remote server 4.

The browser extension module 52 may be a stand-alone program, however, in other embodiments of the present invention the browser extension module 52 is comprised of a multimedia extension module 56 and a translator 58. In such an embodiment the multimedia extension module 56 may be a commercial program such as ShockWave produced by Macromedia. Such multimedia extension modules 56 are ordinarily capable of interfacing with the operating system 6, the web browser 8, and the WAN 2, but may not be able to communicate with the library of video enhancement routines 50. Consequently, when browser extension module 52 includes a multimedia extension module 56 it also must include a translator 58 to facilitate communication between the multimedia extension module 56 and the library of video enhancement routines 50.

Figure 5:
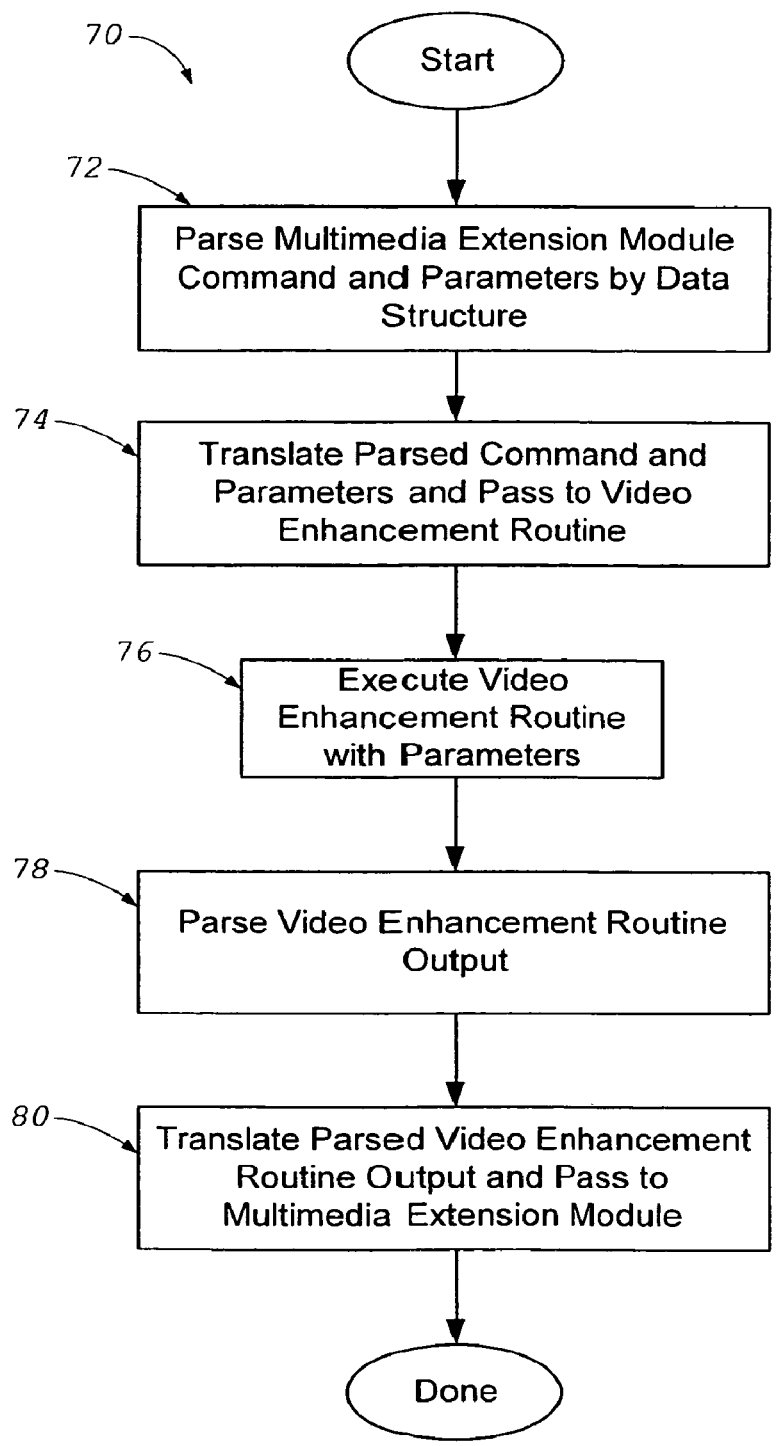
FIG. 5 is a flow chart for the process for executing a video enhanced script where the browser extension module includes a multimedia extension module and a translator.

FIG. 5 shows a flow chart for the process 70 for executing a video enhanced script 54 where the browser extension module 52 includes a multimedia extension module 56 and a translator 58. In the first act or operation 72 the multimedia extension module 56 receives a command from the video enhanced script 54 to run a particular video enhancement routine from the library of routines 50. Included in the command from the video enhanced script 54 should be any parameters required by the video enhancement routine. The multimedia extension module 56 sends the command to the translator 58 where it is parsed according to a protocol that specifies data structure.

In act or operation 74 the parsed command is translated into code that is recognizable by the video enhancement routine. The translated command is then passed to the video enhancement routine. The video enhancement routine next executes the command in accordance with the provided parameters in act or operation 76. For example, the video enhanced script 54 might involve a game for practicing soccer in which the player stands in front of a video camera 60 and sees herself on a monitor in a virtual world in which she's standing on a soccer field. In this virtual world seen on the monitor soccer balls drop from the sky and the object is for her to move her head so as to "head" the soccer balls towards a net.

This script 54 might call first for a determination of where the girl's head is located and then call for a determination of whether it has collided with a soccer ball. The multimedia extension module 56 first receives a command from the script 54 to execute a video enhancement routine for head tracking, with the command including necessary parameters, for instance a clock signal or a frame refresh rate. The video enhancement routine for head tracking receives this command from the translator, which might request, for example, a determination of head location, contour, and orientation. The head tracking routine might then make these determinations by applying image recognition techniques to the digitized video data.

Similarly, script 54 might then ask a collision detection routine to determine whether the girl's head has collided with a virtual ball that script 54 has generated. The command for collision detection would include parameters necessary for the routine to make the determination, such as the data previously returned from the head tracking routine. Next, the output from this video enhancement routine, for instance that the head and the ball had collided and the points of contact on each, is sent back to the translator 58 to be parsed in act or operation 78. Then, in act or operation 80 this output is translated into code having a data structure that is recognizable by the multimedia extension module 56, and passed back to the multimedia extension module 56.

Figure 6:
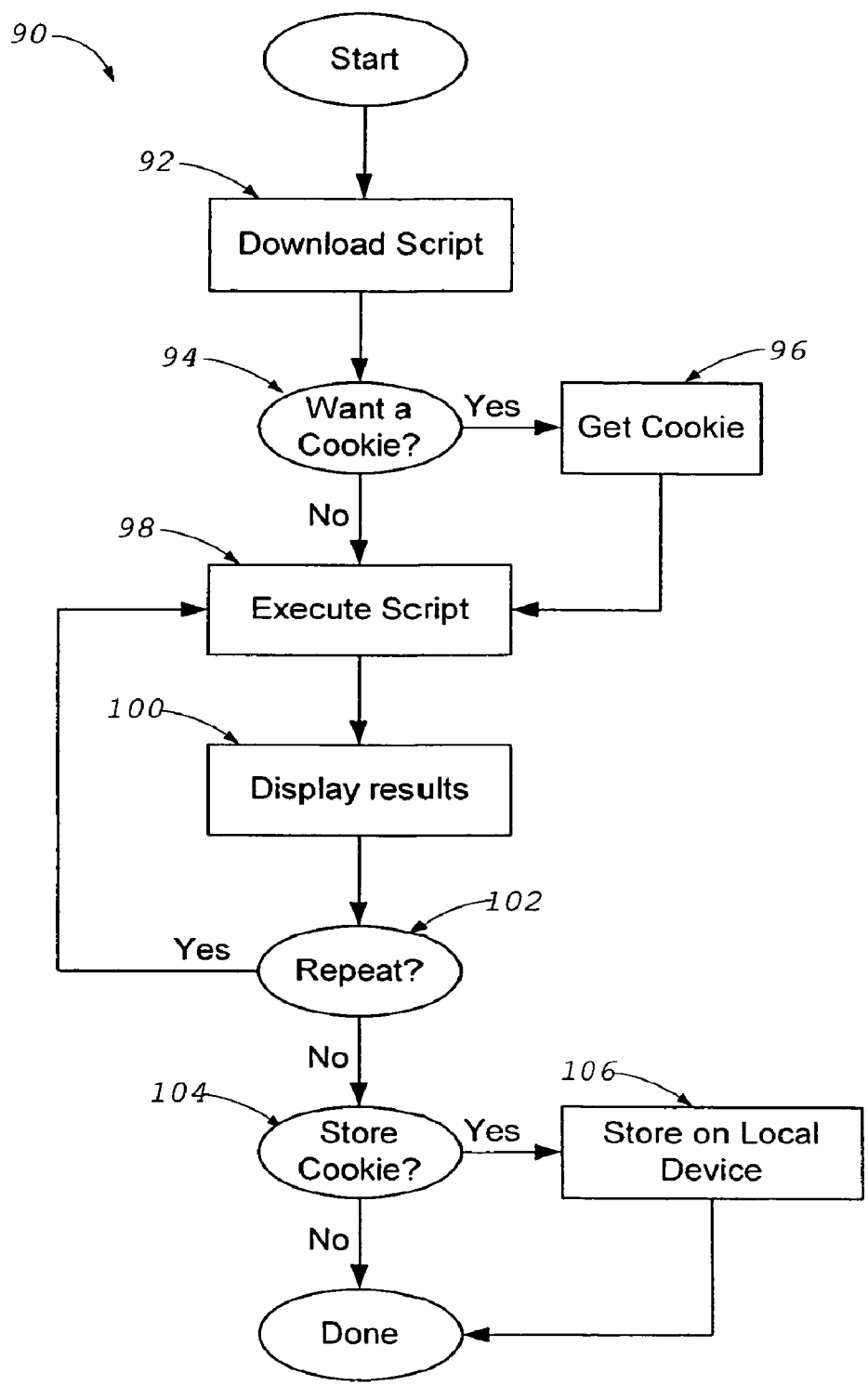
FIG. 6 is a flow chart for the process for downloading and executing a video enhanced script.

FIG. 6 shows a flow chart for the process 90 for downloading and executing a video enhanced script 54. The process begins with act or operation 92 in which a script 54 is downloaded to the user's computer 5. Downloading is accomplished by opening a web browser 8, accessing a server 4 on which the script 54 resides, and copying the script 54 to the computer 5 on which the web browser 8 resides. Accessing the server 4 is achieved by furnishing the web browser 8 with the server's IP address, thus allowing the web browser 8 to contact the server 4 across a WAN 2 such as the Internet. Copying the script 54 to the user's computer 5 involves having the server 4 on which the script 54 is stored divide the script 54 into packets that can be routed across the WAN 2 to be reassembled by another server 4 in communication with the user's computer 5. The script 54, when received by the user's computer 5, can then be stored, for example, in RAM, on a magnetic recording medium 7, or on a server 4 in communication with the computer 5.

In act or operation 94 the script 54 asks whether a cookie is desired. If a cookie is desired it will be obtained in act or operation 96 from a server 4, such as the one that delivered the script 54. The cookie will then be stored either in RAM or on a storage device such as a hard drive 7. Cookies may be used to record one's activities, for example, when accessing a website. Cookies also may record personal information, such as passwords and personal preferences, so the when a user returns to a site, the user may be presented with customized information.

Once a cookie has been obtained, or if no cookie was sought, the video enhancer 42 runs script 54 in act or operation 98, as described above with reference to FIG. 3. The video enhancer 42 in act or operation 100 then displays the results. The results may be displayed on one or more monitors, where some monitors may be connected to the user's computer 5 via a WAN 2. The displayed results may, for example, show a continually refreshed video of the field of view of a video camera 60 with an animated feature superimposed. For instance, a person standing in a room before a video camera 60 might see on a monitor an image of himself in the room with a gremlin hopping on his head. In other embodiments the results may show an actual image of a person in the field of view of a video camera 60 against a virtual backdrop. The person in the above example might see a true image of himself against the backdrop of a cartoon room, or an outdoor scene, or in the midst of an animated cartoon, a non-animated movie segment, or a music video. In further embodiments the displayed results may show an actual image of a person in the field of view of a video camera 60 with superimposed animated body parts or accessories such as a hat or a sword. Other embodiments may combine elements described above. For example, a person standing before a video camera 60 might see himself with superimposed chaps, hat, and holster against a background that's a still image of the OK Corral with animated tumbleweeds rolling past in the distance.

Yet other embodiments of the present invention envision multi-player games in which players interact from different locations across a WAN 2. In the above mentioned example of the person seeing himself at the OK Corral, a second player standing in front of a second video camera 60 could appear in the first person's image as an adversary. Here, the two players might be either be communicating directly across a WAN 2, or they may be communicating across a WAN 2 through a remote server 4 not directly linked to either players' computer 5. In some instances it may be desirable to provide cartoon renderings of remotely located players, rather than real-time images, to reduce the amount of data that must be transmitted. In other cases a real-time image that is not refreshed as frequently may be used, and in other cases only a part of the body, for example the player's head, may be a real-time image while the remainder of his body might be a cartoon rendering.

When a video enhanced script 54 has displayed the final results in act or operation 100, the user may be prompted by the script 54 in act or operation 102 whether the script 54 should be executed anew, which would return the process 90 to act or operation 98. If the script is not to be repeated, then in act or operation 104 the script asks whether a cookie should be stored. If a cookie is to be stored, that cookie will be stored to a local storage device 7 in act or operation 106.

Figure 7:
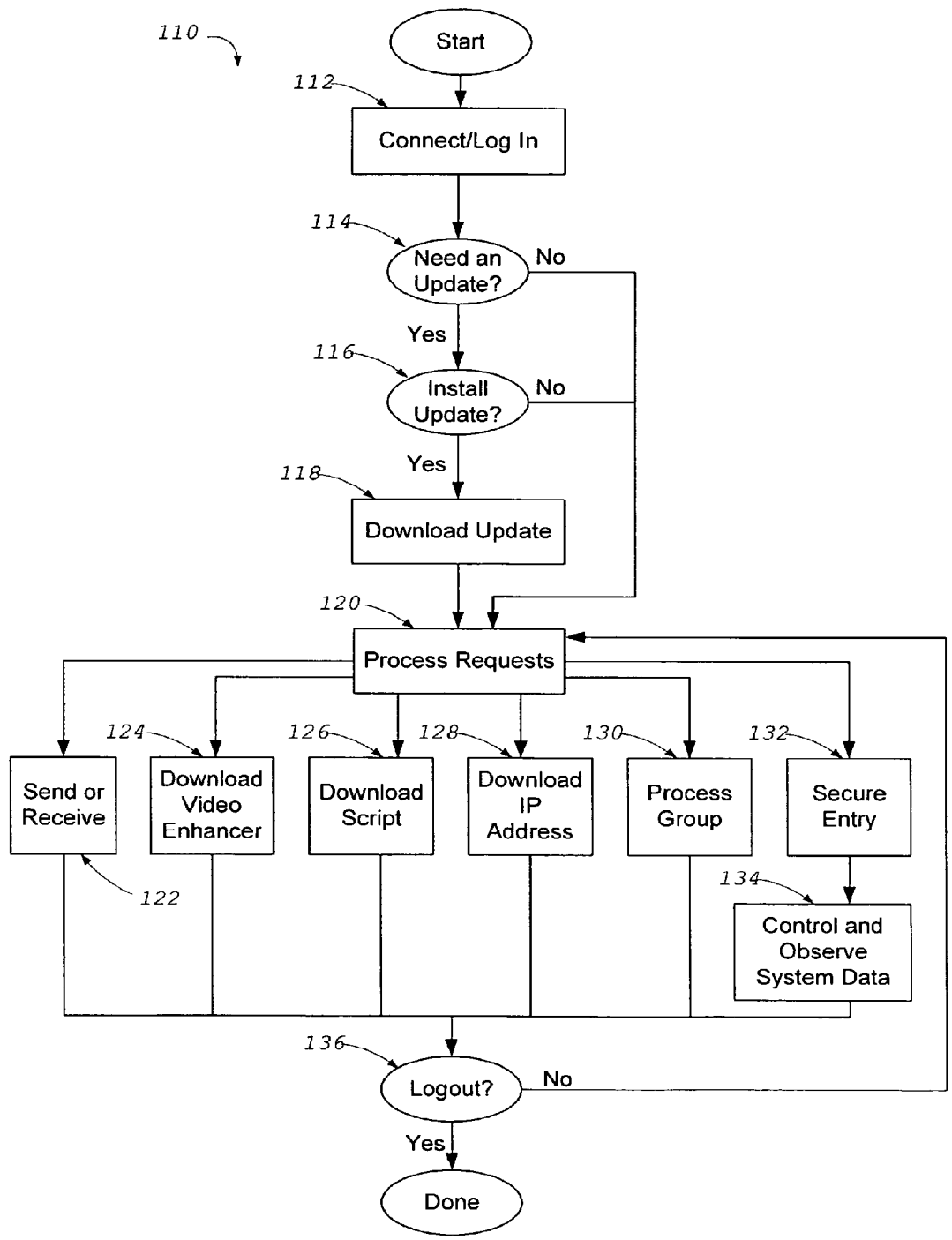
FIG. 7 is a flow chart for the process performed by a server connected to one or more computer systems across a WAN.

FIG. 7 shows a flow chart for the process 110 performed by a server 4 connected to one or more computer systems 5 across a WAN 2. In act or operation 112 a user establishes a connection to the server 4 by providing the IP address of the server 4 to the web browser 8 of the user's computer system 5. Once the connection is established, the server 4 may ask the user to log in by providing a password or some other identifying characteristics. In this way user's may be identified to the server 4 as belonging to one of several possible groups such as paid members, holders of trial subscriptions, and first-time visitors. The group to which the user belongs may limit the types of services the server 4 may perform for that person, or it may prompt the server 4 to issue special offers or run particular banner ads within the user's web browser 8.

In act or operation 114 the server 4 determines whether a browser extension module 52 exists within the web browser 8, and if so, whether it is the most current version available. This sort of information may already exist on the server 4 in the form of a cookie. Alternately, the server 4 may ask for the information from the web browser 8. If the server 4 has a browser extension module 52 update available the process proceeds to act or operation 116, otherwise it progresses to act or operation 120. In act or operation 116 an updated browser extension module 52 is made available to the user. If the user decides to download the updated module 52 this is accomplished in act or operation 118. If the user decides to forego the update then the process proceeds to act or operation 120. It should be noted that server 4 may represent a plurality of linked servers, so that the server 4 supplying the browser extension module 52 may not necessarily be the same server 4 that is providing video enhanced script 54. A system of linked servers are able to provide greater capacity to handle large volumes of requests and provide redundancy so that if one server should fail others will take up the load.

In act or operation 120 the server 4 processes requests from the user by determining what is being asked for and then initiating a task in response. As the server 4 processes a request in act or operation 120 it also records in a database information about the request, for example, the identity of the user and what was requested. A common occurrence might be where the user's computer system 5 requests files or data from the server 4, or seeks to upload files or data to the server 4, which would be performed by act or operation 122. This situation may occur where a user is involved in a game with another user and video images of both users are being passed between the users via the server 4.

Similarly, the user may request in act or operation 120 that the server 4 provide a copy of the browser extension module 52 or of a video enhanced script 54 for downloading to the user's computer system 5. These tasks are handled, respectively, by act or operation 124 and act or operation 126.

In act or operation 128 the server 4 handles requests for IP addresses, for example when a user requests to be connected directly to another user. In handling such a request the server 4 may need to consult a database to determine whether the user is a person with authorization to obtain the requested IP address.

In act or operation 130 the server 4 handles requests to connect users to other users through the server 4. For instance, a user may wish to join a game, but is unaware of any other users presently involved in a game and willing to have others join. To process such a request the server 4 may have to consult a database listing games currently in progress and providing their status. Additional information in such a database may include cross-referenced lists of people that would indicate certain users that should not be connected to other certain users.

In act or operation 132 the server 4 handles requests requiring secure access. In these requests a system administrator, for example, would have to provide a special password to be able to control and observe system data in act or operation 134. A system administrator, may, for example, access sensitive databases, upload new versions of software, or monitor games in progress.

In act or operation 136 the user is offered the choice of logging off of the server 4 or making another request of the server 4. If the response is to stay connected and make a further request, the process 110 returns to act or operation 120, otherwise the process 110 is completed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer implemented method of controlling an event in a virtual environment, comprising:
    receiving video data comprising a first image of a subject;
    causing a virtual environment and a second image of the subject that is based on the first image of the subject to be displayed in a client application;
    determining if the second image of the subject has interacted with a feature in the virtual environment; and
    controlling an event in the virtual environment based on the determination.

2. A method as recited in claim 1, wherein determining if the second image of the subject has interacted with a feature in the virtual environment includes a web browser extension module executing a video enhancement routine.

3. A method as recited in claim 2, wherein the video enhancement routine, the web browser extension module, or both, is located on a server.

4. A method as recited in claim 1, further including causing one or more images representative of interacting with an object to be displayed.

5. A method as recited in claim 1, wherein the subject is a person and determining if the second image of the subject has interacted with a feature in the virtual environment includes identifying and tracking a head of the person in the first image of the subject using the video data.

6. A method as recited in claim 1, wherein determining if the second image of the subject has interacted with a feature in the virtual environment includes determining when at least two tracked features displayed in the client application collide.

7. A method as recited in claim 1, wherein:
    the second image of the subject is substantially identical to the first image of the subject; or
    the second image of the subject is a cartoon rendering of the first image of the subject.

8. A method as recited in claim 1, further comprising modifying the first image of the subject to create the second image of the subject.

9. A method as recited in claim 8, wherein modifying the first image of the subject includes superimposing an animated feature over at least a portion of the first image of the subject.

10. A method as recited in claim 1, wherein the subject is a first user, the method further comprising:
   receiving data representative of an image of a second user interacting with a feature in the virtual environment; and
   causing the image of the second user interacting with the feature in the virtual environment to be displayed in the client application.

11. A method as recited in claim 10, wherein the data representative of an image of the second user interacting with a feature in the virtual environment includes video data comprising one or more real-time video images of the second user, video data comprising one or more real-time video images of a portion of the second user, or video data comprising one or more cartoon renderings of the second user.

12. A method as recited in claim 10, wherein the data representative of an image of the second user interacting with a feature in the virtual environment is received from a computing device associated with the second user directly over a wide area network, or from a server not directly linked to the computing device associated with the second user.

13. A method as recited in claim 10, further comprising sending data representative of an image of the first user interacting with a feature in the virtual environment to a computing device associated with the second user.

14. A computer implemented method comprising:
   receiving video data comprising an image of a subject;
   determining that the image of the subject has interacted with a feature in a virtual environment;
   controlling an event in the virtual environment based on the determination; and
   sending data representative of the controlled event in the virtual environment to a client application.

15. A method as recited in claim 14, wherein the subject is a first user and the client application is a first client application associated with the first user, the method further comprising sending data representative of the controlled event in the virtual environment to a second client application associated with a second user.

16. A method as recited in claim 15, wherein the feature is a first feature and the event is a first event, the method further comprising:
   receiving video data comprising an image of the second user;
   determining that the image of the second user has interacted with a second feature in the virtual environment;
   controlling a second event in the virtual environment based on the determination that the image of the second user has interacted with a second feature in the virtual environment; and
   sending data representative of the second controlled event in the virtual environment to the first and second client applications.

17. A method as recited in claim 16, further comprising sending the video data comprising the image of the first user to the second client application and sending the video data comprising the image of the second user to the first client application.

18. A system for controlling an event in a virtual environment, comprising:
   means for receiving video data comprising a first image of a subject;
   means for causing display of a virtual environment and a second image of the subject that is based on the first image of the subject;
   means for determining if the second image of the subject has interacted with a feature in the virtual environment; and
   means for controlling an event in the virtual environment based on the determination.

* * * * *

UNITED STATES PATENT AND TRADEMARK OFFICE
CERTIFICATE OF CORRECTION

| | | |
|---|---|---|
| PATENT NO. | : 8,255,801 B2 | Page 1 of 1 |
| APPLICATION NO. | : 12/426755 | |
| DATED | : August 28, 2012 | |
| INVENTOR(S) | : Ahmad et al. | |

It is certified that error appears in the above-identified patent and that said Letters Patent is hereby corrected as shown below:

In Column 4, Line 57, delete "DESCRIPTION" and insert -- BRIEF DESCRIPTION --, therefor.

In Column 5, Line 36, delete "it may" and insert -- or it may --, therefor.

In Column 6, Line 62, delete "streaming" and insert -- or streaming --, therefor.

In Column 8, Line 24, delete "so the when" and insert -- so when --, therefor.

Signed and Sealed this
Twelfth Day of February, 2013

Teresa Stanek Rea
*Acting Director of the United States Patent and Trademark Office*